Jan. 2, 1934.  R. T. WISE  1,941,963
CLUTCH
Original Filed Nov. 4, 1930
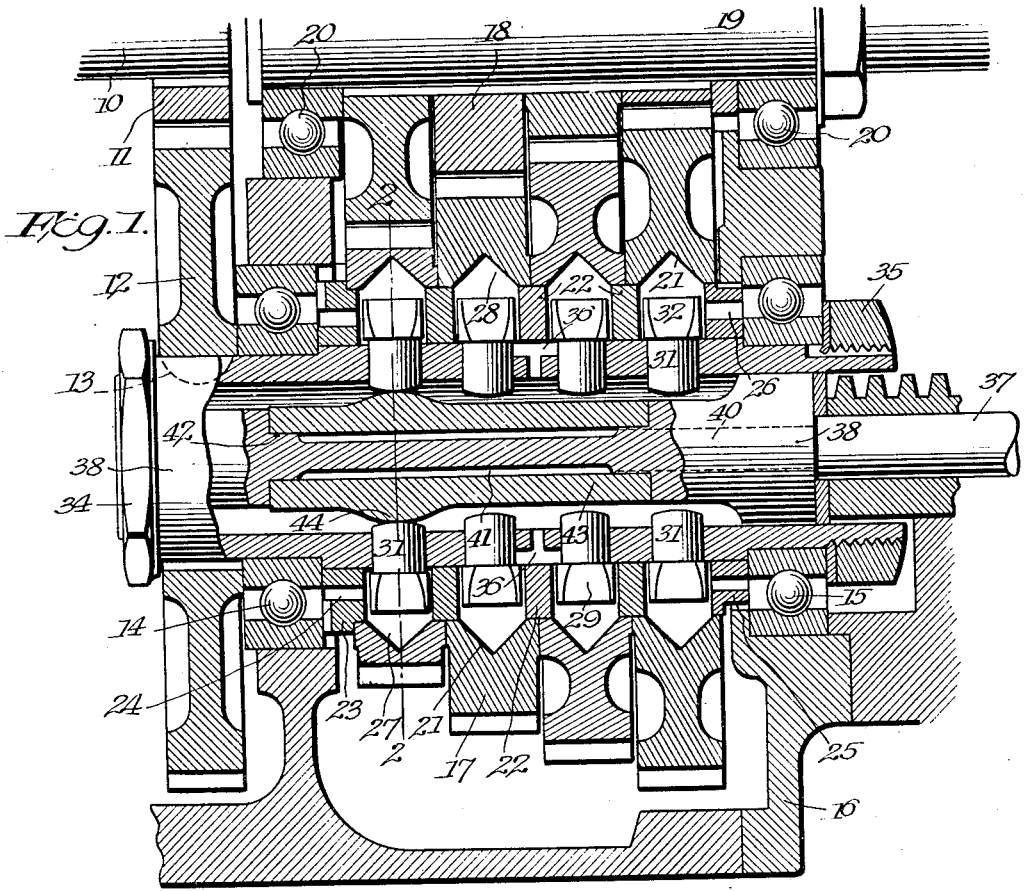
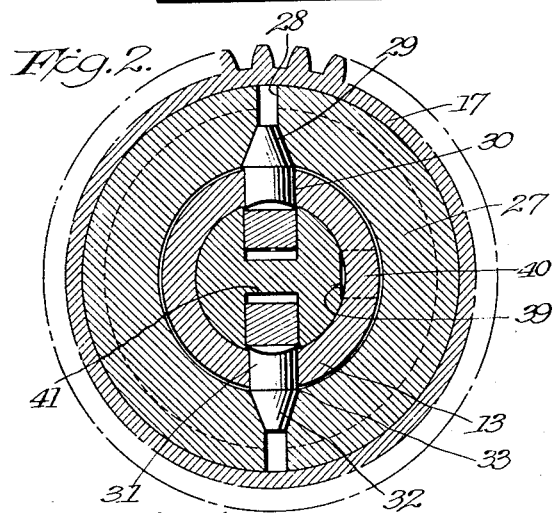
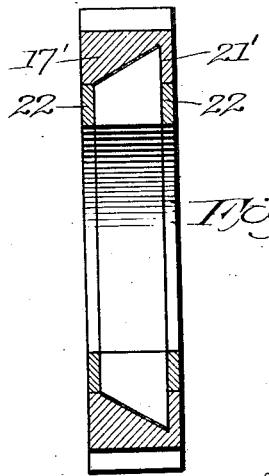
Inventor
Roy T. Wise.

Patented Jan. 2, 1934

1,941,963

UNITED STATES PATENT OFFICE 1,941,963

CLUTCH

Roy T. Wise, Berkeley, Calif., assignor to Wise Patent and Development Company, New York, N. Y., a corporation of Delaware Original application November 4, 1930, Serial No. 493,649. Divided and this application August 9, 1933. Serial No. 684,444

1 Claim. (Cl. 74—59)

This invention relates to new and useful improvements in clutches susceptible of general application and more particularly to clutches especially adaptable for use in conjunction with change speed transmission gearing in which the gears are in constant mesh and the various gear trains are juxtaposed.

The present application which is a division of my copending application Serial No. 493,649, filed November 4, 1930, has as one of its objects to provide a gear construction with an improved mounting so as to permit the parts to be readily assembled or disassembled for the purpose of inspection and repair. A further object comprehends the provision of means for promoting the circulation of lubricant through the parts of the gearing.

Other objects and advantages of the invention will become apparent during the course of the following description.

In the accompanying drawing forming a part of the description and wherein like numerals are employed to designate like parts:

Figure 1 is a fragmentary view in central longitudinal section through a transmission mechanism disclosing the novel clutch construction in accordance with my invention assembled in connection therewith;

Figure 2 is a transverse section through one of the individual clutch mechanisms taken on the line 2—2 of Figure 1;

Figure 3 is a section through a modified form of clutch parts; and

Figure 4 is a side elevation of a modified form of clutch actuator rod.

As set forth in my earlier Patent 1,770,290, granted July 8, 1930, an essential feature of the invention is to provide means included in the clutch for automatically compensating for wear occurring between the parts thereof in the most economical and practical manner and at the same time to provide a clutch construction which can be advantageously employed in a series for selective engagement of any of the clutches by means of the most practical and efficient form of clutch actuating rod possessing simple and sturdy characteristics, giving it increased life and durability under the most severe conditions of use.

Referring now specifically to the drawing, the numeral 10 designates a drive shaft having a drive pinion 11 keyed thereto for mesh with a driven gear 12 keyed to a hollow counter or driven shaft 13. This counter shaft is rotatably mounted in anti-friction bearings 14 and 15 arranged at opposite ends thereof carried by a suitable lubricant carrying housing 16, only portions of which are illustrated. Associated with this counter shaft 13 is a series of gears 17 of varying diameters as shown, adapted for constant mesh with a series of inversely arranged gears 18 juxtaposed and keyed to a driven shaft 19 mounted in anti-friction bearings 20, as shown.

The series of gears 17 are loosely mounted upon the hollow counter shaft 13 in a manner which will presently be described. It will be noted that the bores of these gears 17 are of uniform diameter. The bore of each of these gears has its wall provided with a V-shaped groove 21 as shown in Figure 1, whereas the modification of these gears shown at 17' in Figure 3 has a generally V-shaped groove 21', one wall of which is arranged at right angles to the axis of the gear, whereas the walls of the groove 21 shown in Figure 1, are both arranged obliquely to the axis of the gears.

Each of the gears 17 is rotatably mounted upon a pair of spaced bearing collars or discs 22 loosely mounted upon the hollow driven shaft 13 and since the gears are all disposed co-axially and side by side with the side faces of one juxtaposed with respect to the side faces of adjacent gears, it will be apparent that each collar 22 forms a bearing for the adjacent ends of adjacent gears. Due to this arrangement and relation of parts, it will be apparent that the gears 17 are normally free to rotate relative to the counter shaft 13 and to rotate upon the bearing discs 22 as bearings. A bearing collar 23 is mounted upon the shaft 13 adjacent the anti-friction bearing 14 and is equipped with lubricant passages 24 leading from the bearing 14 to the bore of the adjacent gear 17 to promote thorough circulation of the lubricant throughout the parts. A somewhat similar bearing collar 25 is provided at the opposite end of the set of gears 17 adjacent the bearing 15 and is equipped with lubricant passages 26 leading from the bearing 15 to the bore of the adjacent loose gear 17.

In order to provide for selective clutching of any of the gears 17 to the counter shaft 13, a clutch of novel construction is associated with the bore of each of these gears and since the construction of all of the clutches is identical, a description of one will suffice. Normally free to revolve within the bore of each gear is a pair of segmental resilient clutch shoes 27 having their outer curved surfaces substantially V-shaped to act against the V-shaped groove 21 in the associated gear 17. From Figure 2, it will be observed that a sufficient running clearance is allowed between these clutch shoes 27 and the shaft 13. The exterior faces of these shoes are provided with lubricant grooves, the edges of which are not relieved. It will also be noted that the adjacent ends 28 of the clutch shoes are spaced apart and are tapered as at 29 to form wedge-shaped sockets between the adjacent ends thereof at diametrically opposite points about the shaft 13. Of course, the number of clutch shoes employed may be varied at will, and accordingly, the number illustrated here is in no wise to be considered a limitation.

The hollow counter shaft 13 at diametrically opposite points opposite the tapered sockets provided between adjacent clutch shoes, is drilled with radial openings 30 to slidably mount radially movable clutch elements 31. The bodies of these clutch elements 31 are cylindrical to slidingly fit the openings 30 and are provided with enlarged tapered or wedge-shaped heads 32 to fit the tapered seats or sockets between the clutch shoes. These enlarged heads equip the clutch elements with shoulders 33 for limiting radial movement of the clutch elements inwardly of the hollow shaft 13. Preferably, the active inclined or tapered faces of the clutch elements and adjacent ends of the clutch shoes are inclined to an angle of approximately twenty degrees to diminish the transmission of the stresses incident to torque in a direction toward the axis of the shaft 13. From Figure 2, it will be evident that the foregoing construction causes the clutches to practically completely fill the spaces between the gears and counter shaft. Radial outward movement of these clutch elements 31 causes expansion of the segmental clutch shoes 27 to establish frictional driving engagement with the gears 17 whereby they are rotated by the shaft 13. In their expanding movement, the clutch shoes resiliently bend so that upon retraction or inwardly radial movement of the clutch elements, the inherent spring quality of the shoes returns them to an unclutched position.

Longitudinal displacement of the shaft 13 is prevented by thrust nuts 34 and 35 screwed to opposite ends of the shaft. Such movement is also prevented by the shouldered portions of the shaft 13 engaging the anti-friction bearing races. The intermediate portion of the tubular shaft 13 beneath the intermediate bearing discs 22 is equipped with T-shaped lubricant ducts 36 enabling lubricant to freely circulate inside of the tubular shaft 13 for lubrication of parts disposed therein.

The friction clutches of the set of gears 17 are selectively engaged and disengaged by a clutch actuator rod 37 mounted within the hollow shaft 13 and movable longitudinally in the axis thereof. This clutch actuator rod is moved axially back or forth within the tubular shaft 13 by any suitable means and is provided with enlarged portions 38 at opposite ends to have sliding fit within the bore of the shaft 13 as clearly shown. The forward end of this clutch rod, rearwardly of the forward enlarged head 38, has a diameter considerably less than that of the bore of the shaft 13 and at diametrically opposite points is equipped with a longitudinally extending guide groove 39 adapted to slidingly engage the inner projecting end of a radially extending pin 40 secured to the shaft 13 and projecting into its bore to cause unitary rotation of the actuator rod and the shaft 13. The reduced diameter of the forward end of the clutch actuating rod is such as to permit the clutch elements 31 reaching retracted positions to assure their respective clutch shoes assuming disengaged positions.

This reduced forward end of the clutch actuating rod at diametrically opposite points and opposite the two series of clutch elements 31, is equipped with longitudinally extending gaps or recesses 41 extending through the major portion of this forward end of the rod as shown. Opposite ends of each recess 41 are provided with sockets or shoulders 42 spaced from the bottom thereof to provide seats for opposite ends of a resiliently yieldable bar 43, the bottom of which is spaced from the bottom of its respective groove to provide a gap or slot having both ends closed as clearly shown in Figure 1. Each of these bars 43 is provided with an enlargement 44 or cam for engagement with any selected pair of clutch elements 31 for moving them radially outward to cause expansion of the shoes 27. These enlargements 44 may be hardened in any suitable manner or equipped with stellite caps to increase their wear resisting properties.

From the foregoing, it will be apparent that when the clutch actuator rod 37 is moved to cause the cam portions 44 of the bars 43 to engage any selected pair of clutch elements 31, that the latter are yieldingly moved radially outward to cause expansion of its respective pair of clutch shoes 27, causing them to frictionally and yieldingly engage the bore of the associated gear and establish a driving connection between the same and the shaft 13. The bars 43 being inherently resiliently yieldable, cause the clutch to be held yieldingly engaged to impart the requisite flexibility to the clutch as well as to compensate for any wear occurring between the clutch shoes and gear, the clutch shoes and inclined faces of the clutch elements, or between the inner arcuate ends of the clutch elements and the cams 44. These bars 43 in effect span the gaps provided in the clutch actuating rod and being normally spaced from the bottom of these gaps or recesses 41 are free to yield outwardly to compensate for wear. These bars 43 may be secured in their seats 42 by a snug fit dovetailing or otherwise.

In the modification of the clutch actuating rod 37' shown in Figure 4, this rod is made from inherently resilient material and is provided with spaced enlargements 45 at opposite ends to slidingly fit within the bore of the shaft 13. The intermediate portion of the rod between these enlargements is provided with an elongated longitudinally extending opening or slot 46, both ends of which are closed, thus permitting the bounding portions 47 of the rod to resiliently yield. This rod at diametrically opposite sides and at the medial portions of the slot 46 is equipped with enlargements or cams 48 adapted to actuate the clutch elements 31 hereinbefore described. In this modification, this cam portion of the rod must be constructed from resilient material whereas the clutch actuating rod 37 of the embodiment shown in Figure 1 can be constructed from any suitable material because of the bars 43 possessing the requisite resilience.

It is to be understood that various changes in the construction and arrangement of parts may be resorted to without departing from the scope of the appended claim.

I claim:

In combination with a friction clutch, a hollow shaft having a lubricant duct extending therethrough, anti-friction bearings supporting opposite ends of said shaft, bearing collars loosely mounted on said shaft, the end collars being arranged adjacent said anti-friction bearings and having lubricant ducts, a series of juxtaposed gears rotatably mounted upon said collars, clutch shoes mounted upon said shaft for engagement with said gears, radially movable clutch elements mounted in said shaft to actuate said shoes, and means within the hollow shaft for operating the clutch elements.

ROY T. WISE.